United States Patent
DiFalco et al.

(10) Patent No.: US 7,587,754 B2
(45) Date of Patent: Sep. 8, 2009

(54) ENVIRONMENT INTEGRITY ASSURED TRANSACTIONS

(75) Inventors: Robert A. DiFalco, Portland, OR (US); Thomas E. Good, Portland, OR (US)

(73) Assignee: Tripwire, Inc., Portland, OR (US)

( * ) Notice: Subject to any disclaimer, the term of this patent is extended or adjusted under 35 U.S.C. 154(b) by 715 days.

(21) Appl. No.: 10/328,957

(22) Filed: Dec. 24, 2002

(65) Prior Publication Data

US 2004/0123133 A1     Jun. 24, 2004

(51) Int. Cl.
*H04L 21/00*     (2006.01)
(52) U.S. Cl. ........................................................ 726/4
(58) Field of Classification Search ................ 713/200, 713/201; 709/224, 217; 726/4
See application file for complete search history.

(56) References Cited

U.S. PATENT DOCUMENTS

| | | | | |
|---|---|---|---|---|
| 5,343,527 A | * | 8/1994 | Moore | 713/179 |
| 6,067,575 A | * | 5/2000 | McManis et al. | 719/313 |
| 6,157,721 A | * | 12/2000 | Shear et al. | 380/255 |
| 6,574,742 B1 | * | 6/2003 | Jamroga et al. | 713/400 |
| 6,909,992 B2 | * | 6/2005 | Ashley | 702/184 |

OTHER PUBLICATIONS

Inside Java 2 Platform Security, Li Gong, 1999, p. 27.*

* cited by examiner

*Primary Examiner*—Andrew L Nalven
(74) *Attorney, Agent, or Firm*—Schwabe Williamson & Wyatt

(57) ABSTRACT

In a networked computing environment, a server is equipped to assure the integrity of the service components of a service, including the direct service providing component and one or more supporting components as requested, and a client is equipped to request on behalf of an application in need of the service the integrity assurance. The client is further equipped to either request or accept the service, only upon receiving the integrity assurance. In one embodiment, the request for integrity assurance, and the subsequent conditional request or acceptance of the service is performed in real time.

28 Claims, 8 Drawing Sheets

ENVIRONMENT INTEGRITY ASSURED TRANSACTIONS

FIELD OF THE INVENTION

The present invention relates to the field of computing. More specifically, the present invention is related to trusted real time computing.

BACKGROUND OF THE INVENTION

Advances in microprocessor, networking and related technologies have led to wide spread deployment and adoption of server-client based applications. Today, numerous real time services are offered by a plethora of servers for consumption by networked client devices of all kinds, including but not limited to computers, digital assistants, wireless mobile phones, and so forth.

However, with the proliferation of servers and client devices, and the ubiquitous access afforded to these devices by local, regional and wide area networks, such as the Internet, executables and data are vulnerable to harm. Whether the harm is due to damage caused by a virus, an unauthorized access, or simply due to natural occurrences such as exposure to the elements, the importance of executable and data integrity and security cannot be overstated.

Accordingly, substantial amounts of effort have been invested by the industry in protecting and securing the executables and data, including but not limited to ensuring the parties with whom a client/server engages in the provision or consumption of services is authentic and uncompromised. Numerous authentication, encryption/decryption, obfuscation, tamper resistant and other related techniques are known in the art.

However, the techniques known and practiced to date are substantially limited to authenticating the parties with whom one engages in transaction, protecting the parties directly participating in the transactions and the transactions themselves.

Increasingly, for many real time transactions, the protection or security offered by the prior art is insufficient. Accordingly, it is desirable to further improve the safety and security of client-server based real time transactions.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF THE INVENTION

The present invention includes a method and apparatus for facilitating secure real time transaction between a client and a server, through real time integrity assurance, which may involve service providing and supporting components of multiple levels (also may be referred to as layers).

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will be apparent to one skilled in the art that the present invention may be practiced without the specific details. In other instances, well-known features are omitted or simplified in order not to obscure the present invention.

Terminology

Parts of the description will be presented in data processing terms, such as transaction, authenticate, request, reply, and so forth, consistent with the manner commonly employed by those skilled in the art to convey the substance of their work to others skilled in the art. Accordingly, these terms are to be accorded the meaning as the terms are commonly understood by those ordinarily skilled in the art. As well understood by those skilled in the art, these quantities take the form of electrical, magnetic, or optical signals capable of being stored, transferred, combined, and otherwise manipulated through electrical and/or optical components of a processor and its subsystems.

Part of the descriptions will employ various abbreviations, including but are not limited to:

| | |
|---|---|
| HTTP | Hypertext Transmission Protocol |
| IMAP | Internet Message Access Protocol |
| LDAP | Light Weight Directory Access Protocol |
| MD5 | Message Digest |
| SHA-1 | Secure HASH Algorithm |
| SSL | Secure Socket Layer |
| TCP/IP | Transmission Control Protocol/Internet Protocol |
| XML | Extensible Mark-up Language |

Section Headings, Order of Descriptions and Embodiments

Section headings are merely employed to improve readability, and they are not to be construed to restrict or narrow the present invention.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Overview

Figure 1:
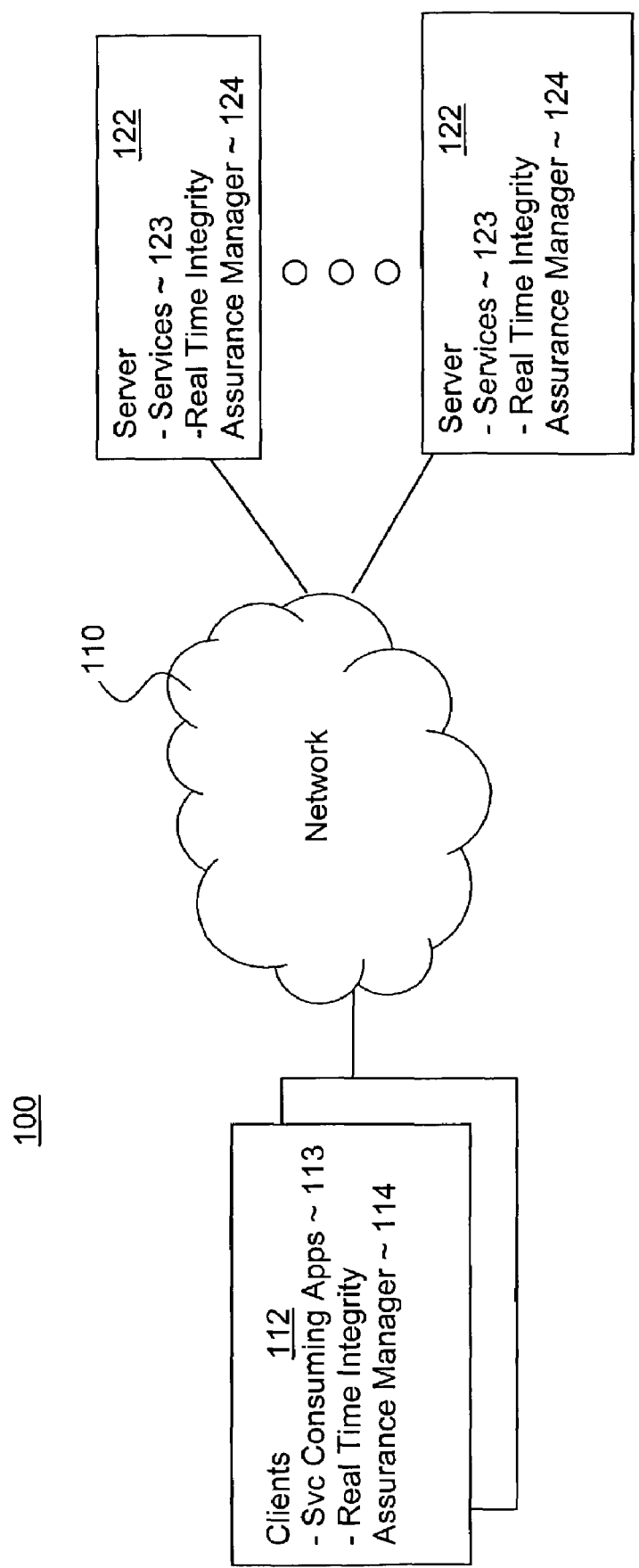
FIG. 1 illustrates an example computing environment, including clients and servers incorporated with the real time integrity assurance teachings of the present invention.

FIG. 1 illustrates an overview of an example computing environment, including a number of clients and servers incorporated with the real time integrity assurance manager of the present invention, in accordance with one embodiment. As illustrated, computing environment 100 includes a number of servers 122 equipped to provide a number of services 123 for consumption by networked clients 112, networked e.g. through network 110.

In addition to services 123, servers 122 are also equipped with real time integrity assurance managers 124 equipped to assure in real time a service requesting client 112 of the integrity of the service providing components of services 123. More specifically, each real time integrity assurance manager 124 is equipped to be able to at least assure in real time a client 112 of the integrity of the direct service providing components of services 123 associated with a transaction, and one other supporting component. In general, each real time integrity assurance manager 124 is equipped to be able to assure in real time a client 112 of the integrity of the direct service providing components of services 123 associated with a transaction, and supporting components up to n levels removed from the direct service providing components, where n is equal to or greater than 1.

In other words, for power, capacity and/or other reasons, servers 122 providing services 123 may be equipped to provide different levels of integrity assurance, some providing none, others providing a few, and yet others providing integrity assurance for components of many levels.

The meaning of the terms "direct service providing components" and "supporting components" of one or more levels removed from the "direct service providing components" may best be understood employing a component model, e.g. the Open System Interface (OSI) model, where supporting components can be thought of as supporting components of an application layer, a presentation layer, a session layer, a transport layer, a network layer, a data link layer and so forth.

Thus, if a client 112 invokes a component A of a service to engage in a transaction, and in the course of conducting the transaction, components B, C, and so forth of "lower" layers are invoked to assist component A in the conduct of the transaction, component A is said to be the direct service providing component, and components B, C and so forth are said to be the supporting components of one or more layers or levels removed from component A.

For the purpose of this application, the terms "layer" and "level" may be considered as synonymous.

Note that component A may be directly invoked or indirectly invoked e.g. through a web interface, an application programming interface or other interfaces of the like. Further, the OSI component or reference model is just one logical model or organization of the components of a service providing server 122. The present invention may be practiced with other logical models or organizations instead.

Continuing to refer to FIG. 1, client 112 is equipped with one or more service consuming applications 113. Additionally, it is also advantageously equipped with a real time integrity assurance manager 114. Real time integrity assurance manager 114 is equipped to request server 122, on behalf of service consuming applications 113 to assure the integrity of the service environment of services involved in a transaction, prior to requesting for the service of the server 122. More specifically, real time integrity assurance manager 114 is equipped to request real time integrity assurance manager 124 to assure for server 122, the integrity of the service environment of services involved in a transaction.

In alternate embodiments, real time integrity assurance manager 114 of client 112 may engage a server 122 in a transaction in parallel while requesting integrity assurance manager 124 for assurance of the integrity of the service environment of the services involved in the transaction. Real time integrity assurance manager 114 of client 112 may elect to accept or reject the result of the transaction, depending on whether integrity assurance manager 124 was able to assure integrity assurance manager 114 to its satisfaction of the integrity of the service environment of the services involved in the transaction.

Servers 122 and services 123 may be any servers and services known in the art, and client 112 may be any client devices known in the art, including but are not limited to wireless mobile phones, palm-sized computing devices, personal digital assistants, laptop computers, desktop computers, set-top box and so forth. Similarly, network 110 may be any local, regional, and wide area, public and/or private networks known in the art.

Real time integrity assurance managers 114 and 124 will be further described after clients and servers 112 and 122 have been further described.

Clients and Servers

Figure 2:
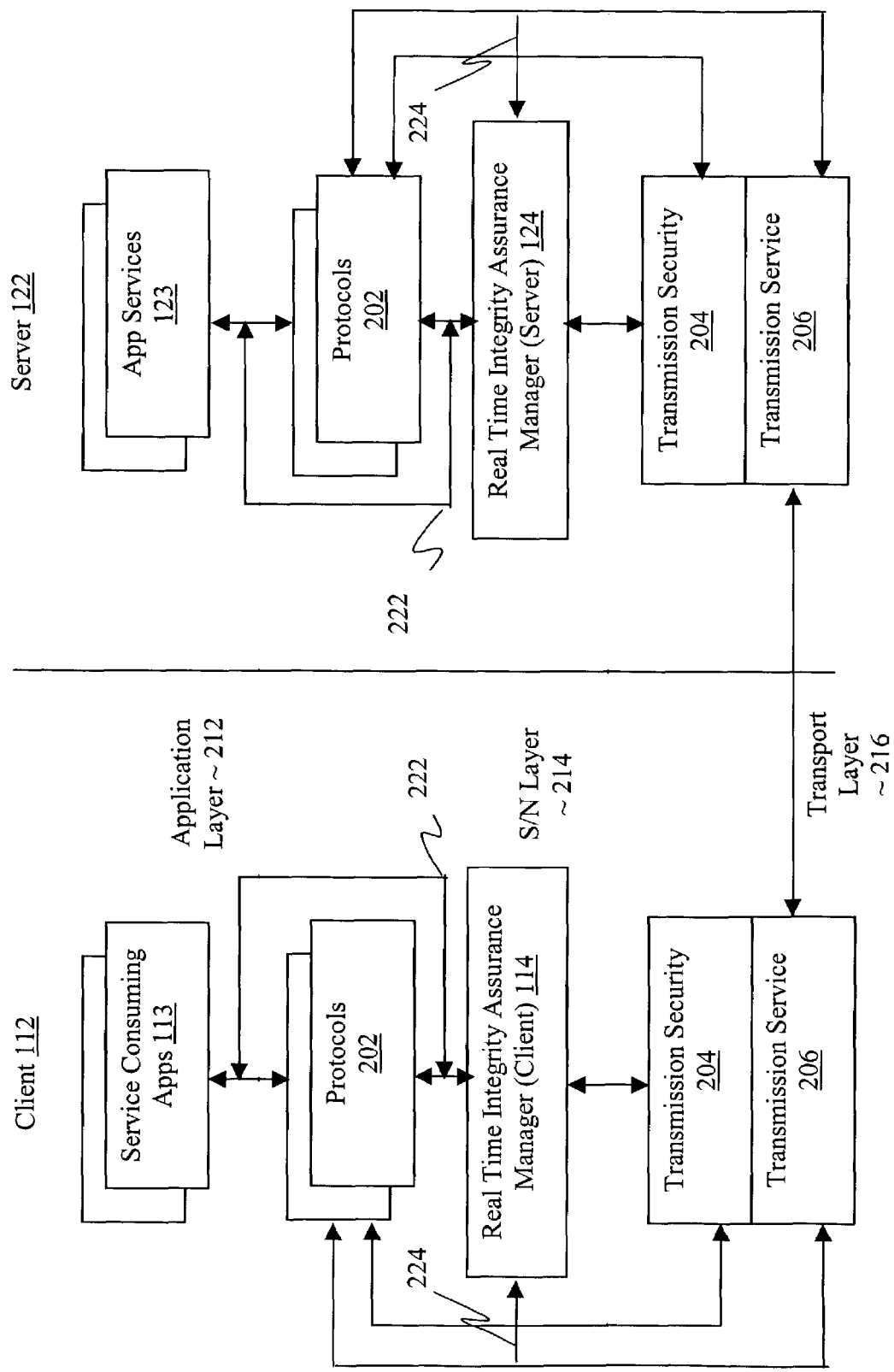
FIG. 2 illustrates one each of a client and a server, incorporated with the teachings of the present invention, in further detail, in accordance with one embodiment.

FIG. 2 illustrates a logical or software component view of one each of clients 112 and servers 122, in accordance with one embodiment. As described earlier, client 112 and server 122 include service consuming applications 113 and services 123. As illustrated, for the embodiment, service consuming applications 113 and services 123 execute in application layer 212 of client 112 and server 122 respectively. Applications 113 engage services 123 in transactions to consume the services provided by services 123.

Additionally, client 112 and server 122 include protocol services 202, real time integrity assurance managers 114 and 124 of the present invention, transmission security and services 204 and 206, coupled to each other and to applications 113 and services 123 as shown. Further, these elements execute in session/networking (S/N) layer 214 and transport layer 216 respectively, as shown. Examples of protocol services 202 include, but are not limited to HTTP, LDAP, IMAP, and so forth. Examples of transport security and service 204 include, but are not limited to SSL and TCP/IP respectively.

In other words, the present invention contemplates that the functionalities or services of real time integrity assurance managers 114 and 124 may be explicitly used by applications 113 and 123, and protocol services 202 that are cognizant of the functionalities/services offered by managers 114 and 124, i.e. through direct invocation and response 222. Alternatively, the functionalities or services of real time integrity assurance managers 114 and 124 may also be placed into operation by having managers 114 and 124 intercept the requests and responses between applications/protocol services 113/123 and 202, and transport security and service 204 and 206.

Further, for ease of initial understanding, the description thus far has made a distinction between real time integrity assurance manager 114 of a client 112 versus real time integrity assurance manager 124 of a server 122, contemplating certain practices of the present invention, where certain devices will be equipped to play the role of either a client or a server, but not both. However, the present invention also contemplates that for certain implementations, a device may act in the role a client or a server at one point in time, for one transaction, but in the opposite role at another point in time, for another transaction. Further, a server 122 may also elect to engage a client 112 in a transaction only if the integrity of the application environment of client 112 is assured. Accordingly, from here on forward, the distinction will be removed, i.e. real time integrity assurance manager 114 and 124 will be described as similarly equipped, although as described earlier, they need only be complementarily equipped.

Real Time Integrity Assurance Manager Cognizant Applications/Services

Figure 3:
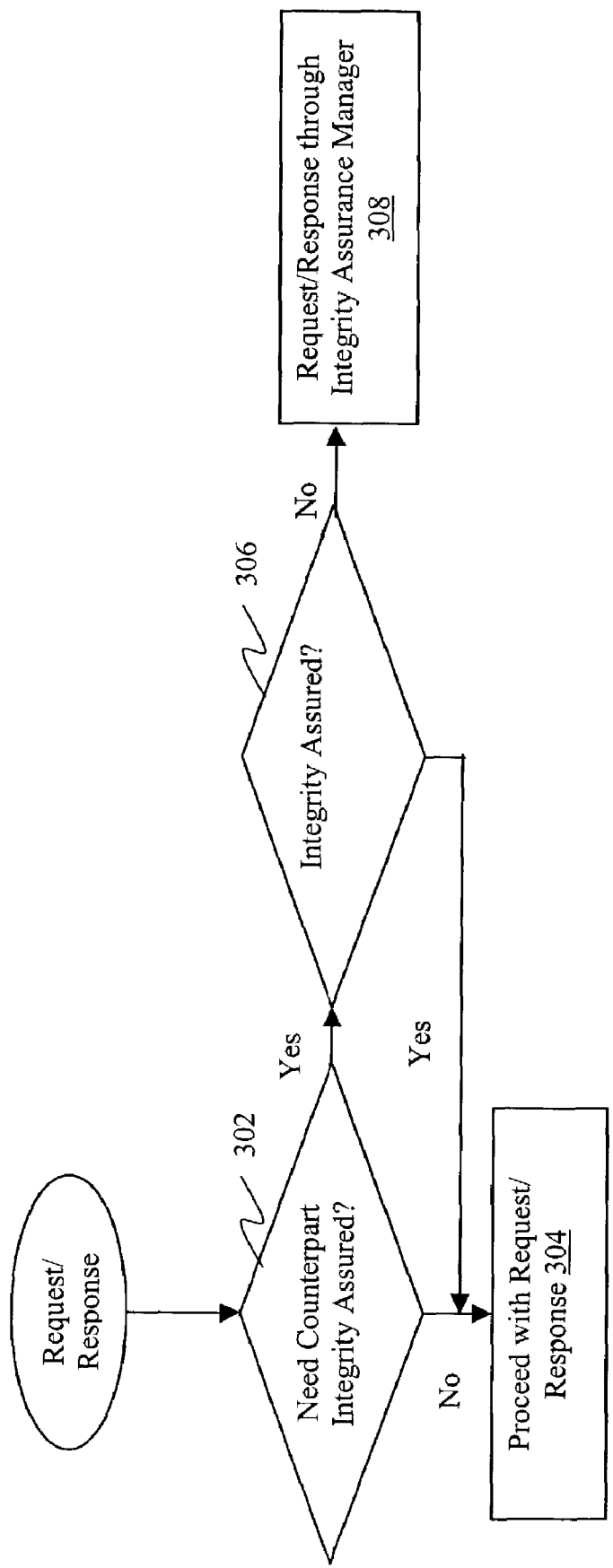
FIG. 3 illustrates the operational flow of the relevant aspects of an application or protocol service to selectively take advantage of the present invention, where the application/protocol service is cognizant of the present invention, in accordance with one embodiment.

FIG. 3 illustrates the overall operational flow of the relevant aspects of an application/service cognizant of real time integrity assurance manager 114 and 124, in accordance with one embodiment. As illustrated, as a request or a response to a request arises, application/service 113/123 or 202 determines whether the request or response is of a type that requires the integrity of the execution environment of the opposing party of the transaction be assured, block 302. If not, application/service 113/123 or 202 proceeds as in the prior art, block 304.

However, if the request or response is of a type that requires the integrity of the execution environment of the opposing party of the transaction be assured, for the embodiment, application/service 113/123 or 202 further determines whether the execution environment of the opposing party has been assured, block 306. If it is, application/service 113/123 or 202 proceeds as in the prior art, block 304.

If not, for the embodiment, application/service 113/123 or 202 invokes real time integrity assurance manager 114/124 to handle the request/response on its behalf, block 308.

In various embodiments, the execution environment of the opposing party may be deemed assured if an assurance was received for not more than t time units. T may be an integer equal to or greater than zero. That is, in some embodiments, the execution environment of the opposing party may never be deemed assured (when T equals zero), especially for certain transactions. In general, whether the execution environment of the opposing party may be deemed assured for a duration, and if so, the length of the duration, are application dependent, i.e. depending on the integrity needs of particular transactions. Preferably, both the operational mode and duration(s) may be configurable, using any one of a number of configuration techniques known in the art. Implementation of such functions is well within the ability of those ordinarily skilled in the art, accordingly will not be further described.

Real Time Integrity Assurance Manager

Figure 4:
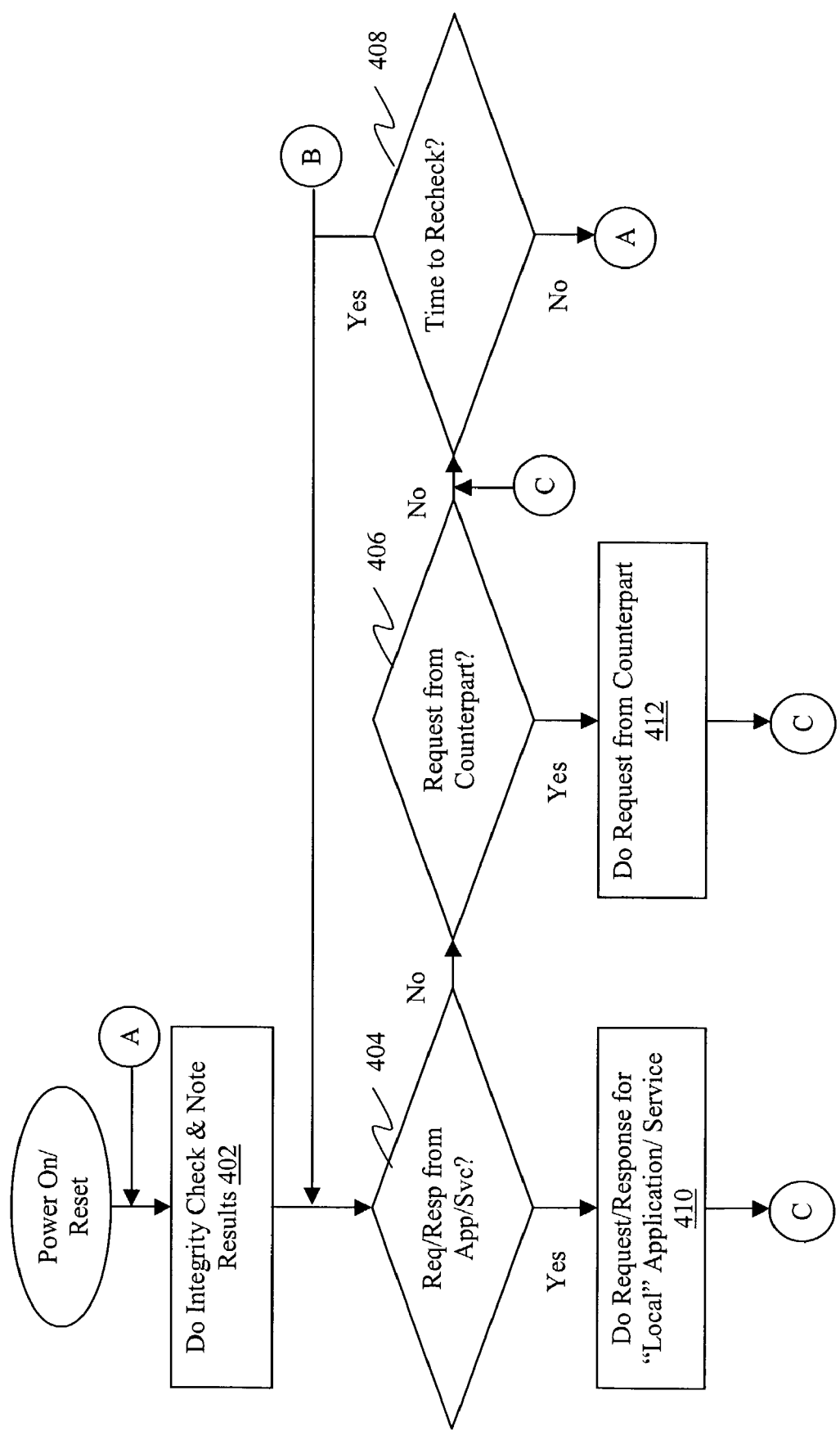
FIG. 4 illustrates the operational flow of the relevant aspects of the real time integrity assurance manager of the present invention, in accordance with one embodiment.

FIG. 4 illustrates the overall operational flow of real time integrity assurance manager 114/124, in accordance with one embodiment. As illustrated, for the embodiment, on power on/reset, manager 114/124 first performs an integrity check on its host apparatus, i.e. client 112 or server 122, and notes the results, block 402.

Thereafter, manager 114/124 awaits a request from a "local" application/service 113/123 or 202 or a request from its counterpart 124/114, blocks 404-408.

If manager 114/124 receives a request/response from a "local" application/service 113/123 or 202, it proceeds to service the "local" request/response, block 410. On the other hand, if manager 114/124 receives a request/response from a counterpart 124/114, it proceeds to service the request/response from its counterpart, block 412.

If no request/response is received from either a "local" application/service 113/123 or 202, or its counterpart 124/114, manager 114/124 further determines whether it is time to recheck the integrity of the execution environment of its host device, i.e. client 112 or server 122.

In various embodiments, the integrity checking may be performed continuously, i.e. a new integrity checking may start as soon as one is completed.

Integrity Check

Figure 5A:
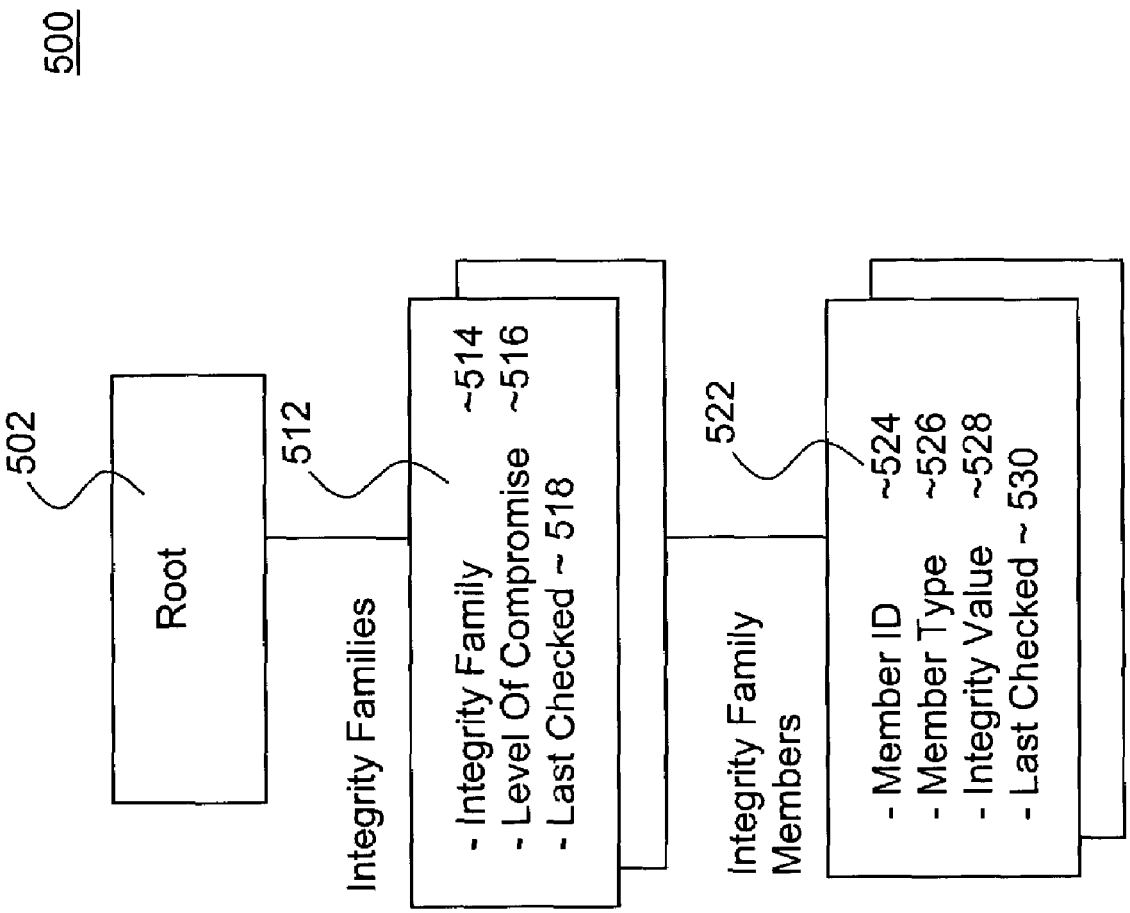
FIG. 5a illustrates an example data structure suitable for use to practice the integrity check aspect of the present invention, in accordance with one embodiment.
Figure 5B:
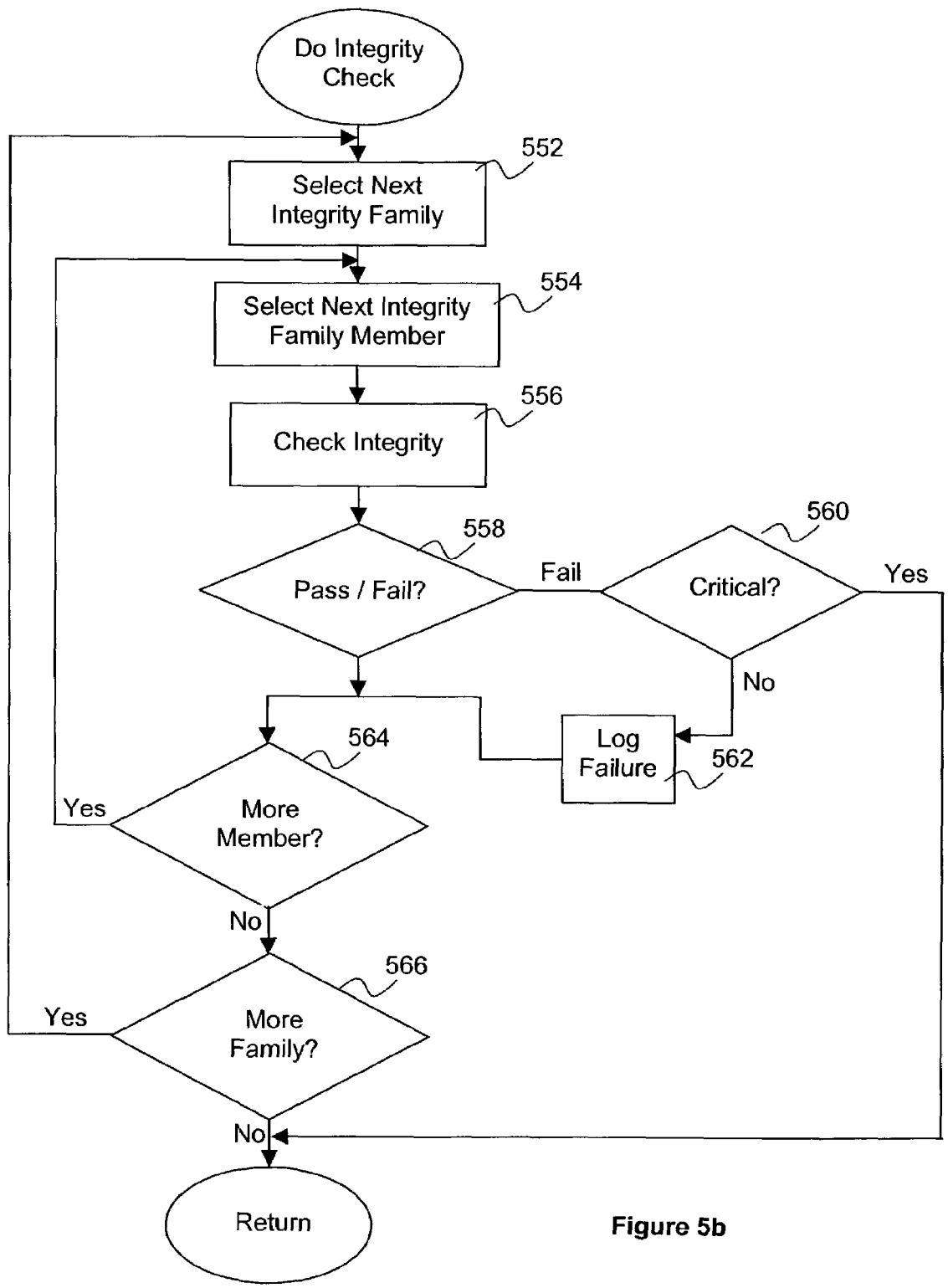
FIG. 5b illustrates the operational flow of the relevant aspects of an integrity manager (which may be a part of the real time integrity assurance manager of the present invention), in accordance with one embodiment.

Referring now to FIGS. 5a-5b wherein integrity checking on an exemplary client/server, in accordance with one embodiment, is illustrated. More specifically, FIG. 5b illustrates the operational flow of integrity checking, in accordance with one embodiment, and FIG. 5a illustrates an associated data structure suitable for use to practice the integrity checking operations of FIG. 5b. For the illustrated embodiment, the integrity checking operations to be described are also performed by real time integrity assurance manager 114/124. However, in alternate embodiments, the operations may be performed by other "managers".

As illustrated in FIG. 5a, for the embodiment, data structure 500 includes a root object 502 having a number of children Integrity Family objects 512, which in turn have a number of children Integrity Family Member objects 522.

Each Integrity Family object 512 includes in particular Integrity Family Identification and other attributes 514-518.

Integrity Family Identification attribute 514 is employed to identify a "family" of components, from the perspective of integrity assurance. One example for organizing service providing components, direct or assisting, of services 123 into integrity families, for integrity assurance purpose, is organizing the components as described earlier, in accordance with a component model, e.g. the OSI reference models. That is, components are organized in accordance with whether the support services they provide are application support services, presentation support services, session support services, and so forth.

In alternate embodiments, the components may be organized in terms of whether the components are members of the kernel of the operating system, a shared/non-shared library, whether the components have privileged access or not, and so forth. That is, the components are organized into the families of "privileged kernel components of the operating system", "other privileged components of the operating system", "non-privileged components of the operating system", "privileged and non-shared library components", "privileged and shared library components", "non-privileged and non-shared library components", "non-privileged and shared library components", and so forth.

The term "privilege" as used herein refers to the "authority" of the component in performing certain operations on the host computing apparatus, e.g. whether the component may access certain registers and/or memory locations of the host computing apparatus. Typically, the delineation between "privileged" and "non-privileged" entities is operating system dependent.

In alternate embodiments, other manners of organization may be practiced instead.

An example of an other attribute 516-518 is a Level of Compromise attribute 516. Level of Compromise attribute 516 may e.g. be employed to denote a risk level in the event a member of the integrity family fails an integrity check. The risk level enables real time integrity assurance manager 114/124 or other security management entities to determine remedial actions, based on the risk level. For example, in one embodiment, the risk level enables real time integrity assurance manager 114/124 to determine whether soft fail over may still occur.

Integrity based soft fail over is the subject matter of co-pending application, Ser. No. 10/251,545, entitled "Computing Environment and Apparatuses with Integrity based Fail Over", filed Sep. 19, 2002.

Another example of other attributes 516-518 is a Last Checked attribute 518 denoting the last time when components of the integrity family were checked.

Each Integrity Family Member object 522 includes in particular Member ID attribute 524, Member Type attribute 526, Integrity Measure attribute 528 and Last Checked attribute 530.

Member ID attribute 524 is employed to specifically denote or identify a component, e.g. the name of an executable, a system data, and so forth, whereas Member Type attribute 526 is employed to denote the type of the named component, i.e. whether it is an executable, a system data, and so forth. Integrity Measure attribute 528 denotes the measure to be employed to determine whether the integrity family member is to be considered compromised or not, e.g. a signature of an executable or a system data value. Signatures may be in the form of MD5, SHA-1, or other hashing values of like kind. Last Checked attribute 530 is employed to denote the last time integrity of the component was checked.

In alternate embodiments, other data organizations may be employed instead.

As described earlier, FIG. 5b illustrates the process of integrity check more fully. As illustrated, manager 114/124 first selects an integrity family to start verifying its component, e.g. components of a layer/level, or the privileged kernel of the operating system, block 552. Upon selecting an integrity family, manager 114/124 selects a member of the integrity family, block 554. The selection may be made using the earlier described data structure 500.

Upon selecting an integrity family member, manager 114/124 verifies its integrity, block 556. The action may include verifying the state of an executable component conforming to an expected signature, e.g. MD5 or SHA-1, or the state of a system data conforming to an expected value, and so forth.

At block 558, manager 114/124 determines whether the component/data passes the verification check or not. If manager 114/124 determines the component/data fails the verification check, it further determines if the failure is to be considered critical. The determination e.g. may be based on the severity of compromise associated with the component/data's integrity family, block 560.

If the failure is to be deemed as a critical failure, manager 114/124 immediately terminates the verification process, and initiates one or more remedial actions, e.g. the earlier described example soft fail over process. On the other hand, if the failure is not deemed to be a critical failure, integrity assurance manager 114/124 merely logs the non-critical integrity failure, block 562, and continues at block 564.

Back at block 558, if manager 114/124 determines the component/data passes the integrity verification, it also continues at block 564.

At block 564, manager 114/124 determines whether there are additional members of the selected integrity family remaining to be verified. If so, manager 114/124 returns to block 554, and continues from there as earlier described.

If all members of the selected integrity family have been verified, manager 114/124 continues at block 566, and determines whether there are additional integrity families remaining to be verified. If so, manager 114/124 returns to block 552, and continues from there as earlier described.

If all integrity families have been verified, the integrity verification is completed.

Servicing Local/Counterpart Request/Response

Figure 6:
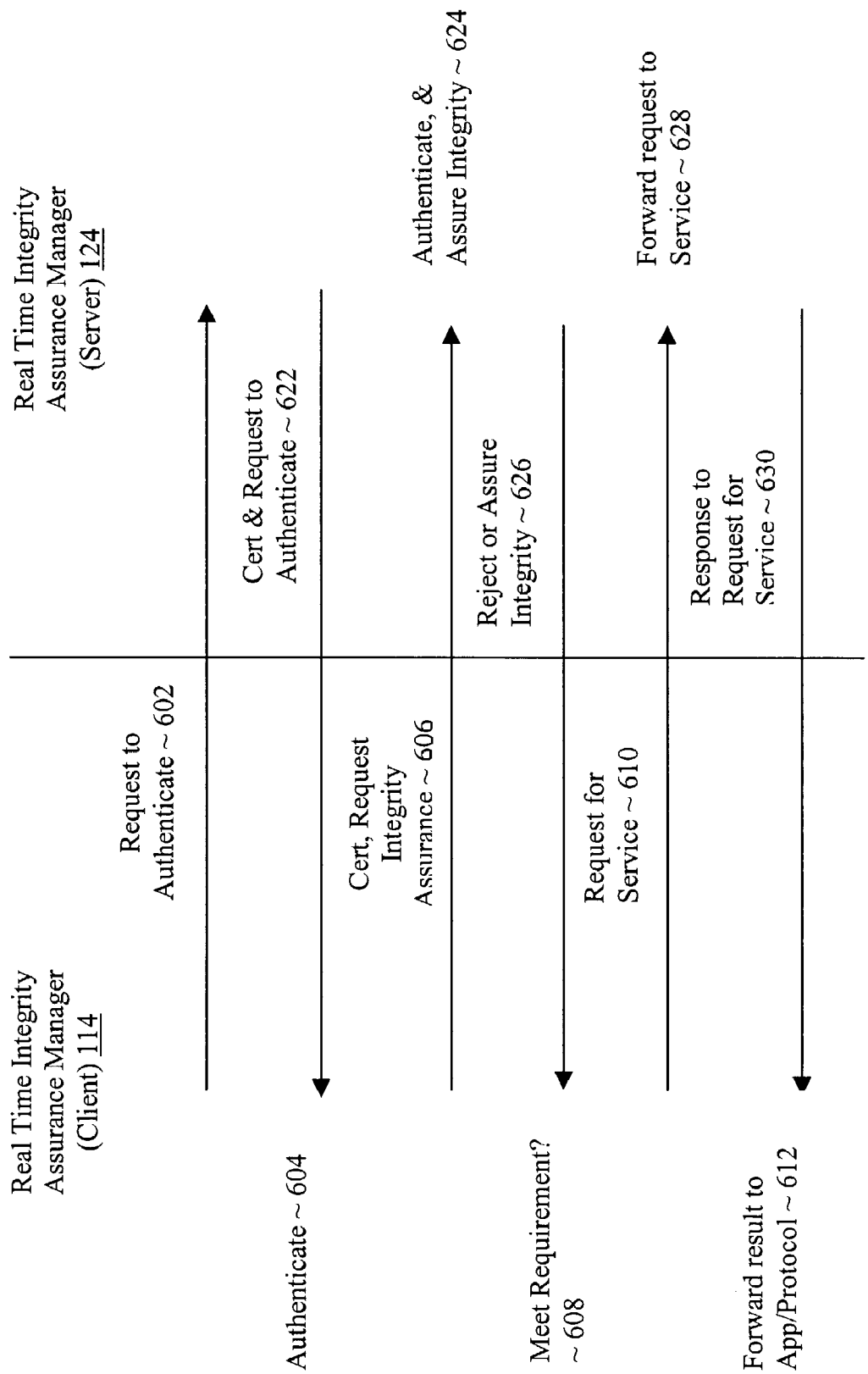
FIG. 6 illustrates the operational flow of the relevant aspects of the real time integrity assurance managers of a client and a server for practicing the present invention, in accordance with one embodiment.

FIG. 6 illustrates the operational flow of the relevant aspects of the real time integrity assurance managers of a client and a server for practicing the present invention, in accordance with one embodiment. For ease of understanding, the respective operational flow will be jointly described as a protocol flow between real time integrity assurance managers 114 and 124. For the embodiment, all requests/responses are transmitted between managers 114 and 124 through transport security and service 204 and 206 (although the use of transport security is optional).

As illustrated, for the embodiment, in response to a "local" request/response, manager 114/124 requests its counterpart manager 124/114 to authenticate itself, op 602. As described earlier, the request is submitted through the transport security/service 204/206. Usage of transport security 204 to secure the transmission itself is optional.

On receipt of the request, for the embodiment, counterpart manager 124 responds with its certificate, and likewise requests manager 114 to authenticate itself, op 622. Similarly, the response is submitted through the transport security/service 204/206. Usage of transport security 204 to secure the transmission itself is optional.

On receipt of the response, manager 114 authenticates manager 124 based on the provided certificate, op 604. The authentication process may be performed in any one of a number of known manner, accordingly, will not be further described.

Assuming manager 114 is successful in authenticating manager 124, manager 114 responds with its certificate, and requests manager 114 to authenticate itself, op 606.

On receipt of the response and new request, manager 124 authenticates manager 114 based on the provided certificate, op 624. Again, the authentication process may be performed in any one of a number of known manners.

Assuming manager 124 is successful in authenticating manager 114, manager 124 either responds with the requested integrity assurance, based on the results of its periodic/continuous integrity checks, or rejects the request for integrity assurance, if the request is made in a manner including the integrity assurance requirement and manager 124 is unable to meet the requirement, for whatever reason, op 626.

The integrity requirement for a transaction may be communicated from application/service 113 or 202 to manager 114 as part of the request. Alternatively, client 112 may be configured with integrity requirements of various transactions that are accessible to manager 114. The integrity requirement may even be configured using manager 114. Implementation of such facilities are within the ability of those ordinarily skilled in the art, accordingly will not be further described.

On receipt of the assurance, manager 114 determines whether the assurance meets the integrity requirement of client 112 for the transaction, op 608. As described earlier, the integrity requirement may be provided as part of the service request, or generally accessible to manager 114.

Assuming the assurance meets the integrity requirement of client 112 for the transaction, manager 114 submits the original request for service, on behalf of application/service 113/ 202, op 610.

On receipt of the request, manager 124 routes the request to services 123 or 202 for handling, op 628.

On receipt of the service results from services 123 or 202, manager 124 forwards the results back to manager 114, op 630.

Manager 114 in turn forwards the results to application/ service 113/202, op 612.

At operation 608, if manager concludes that the integrity assurance receives from counterpart manager 124 does not meet the requirements of the transaction, manager 114 may abort the request, and inform application/service 113/202 of the failure, as appropriate.

As described earlier, in alternate embodiment, managers 114/124 may engage each other to provide the integrity assurance of the service environment of server 124 for the transaction in parallel while the services for a transaction are being performed. The results of the transaction are accepted/kept or rolled back when upon determining that server 124 is able to assure the integrity of its service environment to the satisfaction of manager 114.

Example Computer System

Figure 7:
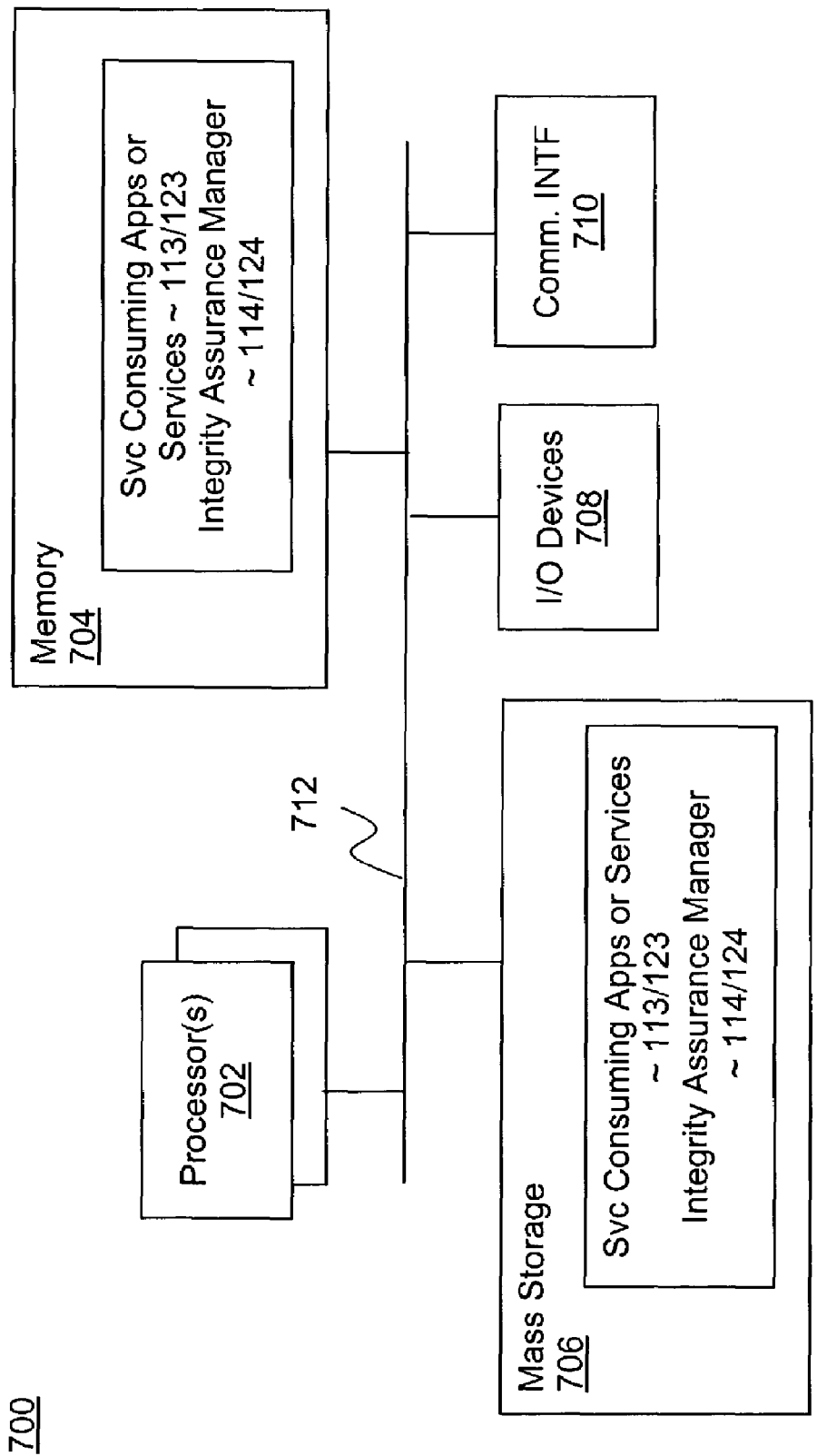
FIG. 7 illustrates an example computer system suitable for use to practice the present invention, in accordance with one embodiment.

FIG. 7 illustrates an example computer system suitable for use as either a client or a server to practice the present invention, in accordance with one embodiment. Depending on the size, capacity or power of the various elements, example computer system 700 may be used as a server 122 to host the services 124 and the operating system, including integrity assurance manager 124, or as a client 112.

As shown, computer system 700 includes one or more processors 702, and system memory 704. Additionally, computer system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown).

Each of these elements performs its conventional functions known in the art. In particular, when employed as a server 122, system memory 704 and mass storage 706 are employed to store a working copy and a permanent copy of the programming instructions implementing real time integrity assurance manager 124 and so forth. On the other hand, when employed as a client 112, system memory 704 and mass storage 706 are employed to store a working copy and a permanent copy of the programming instructions implementing real time integrity assurance manager 114 and so forth. The permanent copy of the programming instructions may be loaded into mass storage 706 in the factory, or in the field, through e.g. a distribution medium (not shown) or through communication interface 710 (from a distribution server (not shown)).

The constitution of these elements 702-712 are known, and accordingly will not be further described.

CONCLUSION AND EPILOGUE

Thus, it can be seen from the above descriptions, a novel computing environment with enhanced computing integrity, including apparatuses and methods employed or practiced therein has been described.

While the present invention has been described in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. In a networked computing environment, a method of operation comprising:

a client, having a need for a service of a server with the service to be provided from the server by a plurality of service providing components residing and to be executed on the server including a direct service providing component and one or more supporting components supporting the direct service providing component in providing the service, requesting the server to assure the integrity of the service providing components including the direct service providing component and the one or more supporting components;

the client either requesting the service to be provided or accepting the requested service only upon receiving the requested integrity assurance from the server; and the server verifying the integrity of the service providing components including the direct service providing component and the one or more supporting components periodically;

wherein said server verifying the integrity of the service providing components including the direct service providing component and the one or more supporting components periodically comprises the server verifying the integrity of the direct service providing component and a first subset of the one or more supporting components with one periodicity, and a second subset of the one or more supporting components with another periodicity.

2. The method of claim 1, wherein said client requesting of the server to assure integrity of the service providing components comprises the client requesting the server to assure the integrity of the direct service providing component and the one or more supporting components, said supporting components being up to n level(s) removed from the direct service providing component, where n is an integer equal to or greater than one.

3. The method of claim 2, wherein n is greater than one.

4. The method of claim 1, wherein said client requesting of the server to assure integrity of the service providing components comprises an application environment integrity assurance manager of the client requesting on behalf of an application in need of the service, an application environment integrity assurance manager of the server to assure on behalf of the service providing components, the integrity of the service providing components, including the direct service providing component and the one or more supporting components as requested.

5. The method of claim 4, wherein the method further comprises the application environment integrity assurance manager of the server assuring, on behalf of the service providing components, the application environment integrity assurance manager of the client, the integrity of the service providing components, including at least the direct service providing component and the one or more supporting components requested by the application environment integrity assurance manager of the client, on behalf of the application in need of the service.

6. The method of claim 5, wherein the application environment integrity assurance managers of the client and the server request and assure the other through a secure transport layer of the client and a secure transport layer of the server.

7. The method of claim 1, wherein the method further comprises the server assuring the client the integrity of the service providing components including at least the direct service providing component and the one or more supporting components requested by the client.

8. The method of claim 1, wherein the method further comprises the server verifying the integrity of the direct service providing component and the one or more supporting components requested by the client in real time.

9. A networked computing environment comprising:
a server having stored thereon a plurality of service providing components to provide a service from the server including a direct service providing component and one or more supporting components supporting the direct service providing component in providing the service from the server, the server further including an ability, when requested, to assure the integrity of the service providing components, including the direct service providing component and the one or more supporting components as requested, the plurality of service providing components to be executed on the server; and
a client coupled to the server, and equipped to request the integrity assurance and either request the service or accept the requested service only upon receiving the requested integrity assurance;
wherein the server is further equipped to verify the integrity of the service providing components including the direct service providing component and a plurality of supporting components periodically; and
wherein the server is equipped to verify the integrity of the direct service providing component and a first subset of the supporting components with one periodicity, and a second subset of the supporting components with another periodicity.

10. The networked computing environment of claim 9, wherein the server is equipped to assure the integrity of the direct service providing component and supporting components up to n level(s) removed from the direct service providing component, where n is an integer equal to or greater than one, and the client is equipped to so request for integrity assurance.

11. The networked computing environment of claim 10, wherein n is greater than one.

12. The networked computing environment of claim 9, wherein said server is equipped with an application environment integrity assurance manager to assure on behalf of the service providing components, the integrity of the service providing components, including the direct service providing component and at least one of the supporting components, as requested, and the client is also equipped with an application environment integrity assurance manager to so request, on behalf of an application in need of the service, the application environment integrity assurance manager of the server for integrity assurance.

13. The networked computing environment of claim 12, wherein each of the server and the client further comprises a secure transport layer, and the application environment integrity assurance managers of the server and the client are further equipped to assure and request the other through the secure transport layers of the server and the client.

14. The networked computing environment of claim 9, wherein the server is further equipped to verify the integrity of the direct service providing component and the supporting components requested by the client in real time.

15. In a server, a method of operation comprising:
receiving a request to assure the integrity of service providing components of a service provided from the server, including at least a direct service providing component and at least one other supporting component residing and to be executed on the server, the at least one other supporting component supporting the direct service providing component in providing the service from the server;
in response, assuring the requestor the integrity of the service providing components of the service, including at least the direct service providing component and at least the supporting component(s) requested; and
verifying the integrity of the service providing components including the direct service providing component and a plurality of supporting components periodically;
wherein said verifying of the integrity of the service providing components including the direct service providing component and a plurality of supporting components periodically comprises verifying the integrity of the direct service providing component and a first subset of the supporting components with one periodicity, and a second subset of the supporting components with another periodicity.

16. The method of claim 15, wherein said request requesting integrity assurance of the direct service providing component and supporting components up to n level(s) removed from the direct service providing component, where n is an integer equal to or greater than one.

17. The method of claim 16, wherein n is greater than one.

18. The method of claim 15, wherein said receiving comprises receiving by an application environment integrity assurance manager of the server, on behalf of the service providing components, from an application environment integrity assurance manager of the client, the request, requesting on behalf of an application in need of the service, assurance of the integrity of the service providing components including the direct service providing component and at least one of the supporting components.

19. The method of claim 18, wherein said assuring comprises the application environment integrity assurance manager of the server assuring on behalf of the service providing components, the application in need of the service, via the application environment integrity assurance manager of the client, the integrity of the service providing components including at least the direct service providing component and the supporting components requested by the application environment integrity assurance manager of the client.

20. The method of claim 19, wherein the application environment integrity assurance managers of the client and the server request and assure the other through a secure transport layer of the client and a secure transport layer of the server.

21. The method of claim 15, wherein the method further comprises verifying the integrity of the direct service providing and the supporting components requested in real time.

22. A computing apparatus comprising:
storage medium having stored therein a plurality of programming instructions designed to enable the computing apparatus to
receive a request to assure the integrity of service providing components of a service provided from the computing apparatus, including at least a direct service providing component and at least one other supporting component residing and to be executed on the computing apparatus, the at least one other supporting component supporting the direct service providing component in providing the service from the computing apparatus;

in response, assure the requestor the integrity of the service providing components of the service, including at least the direct service providing component and at least the supporting component(s) requested;

verify the integrity of the service providing components including the direct service providing component and a plurality of supporting components periodically; and a processor coupled to the storage medium to execute the programming instructions;

wherein the programming instructions are further designed to perform said verifying of the integrity of the service providing components including the direct service providing component and a plurality of supporting components periodically by verifying the integrity of the direct service providing component and a first subset of the supporting components with one periodicity, and a second subset of the supporting components with another periodicity.

23. The apparatus of claim 22, wherein said request requesting integrity assurance of the direct service providing component and supporting components up to n level(s) removed from the direct service providing component, where n is an integer equal to or greater than one.

24. The apparatus of claim 23, wherein n is greater than one.

25. The apparatus of claim 22, wherein the programming instructions implement an application environment integrity assurance manager to receive, on behalf of the service providing components, the request, from an application environment integrity assurance manager of the client, requesting on behalf of an application in need of the service, assurance of the integrity of the service providing components including the direct service providing component and at least one of the supporting components.

26. The apparatus of claim 25, wherein the programming instructions are further designed to implement the application environment integrity assurance manager to assure, on behalf of the service providing components, the application in need of the service, via the application environment integrity assurance manager of the client, the integrity of the service providing components including at least the direct service providing component and the supporting components requested by the application environment integrity assurance manager of the client.

27. The apparatus of claim 26, wherein the programming instructions are further designed to implement the application environment integrity assurance manager to accept the request from, and provide the assurance to the application environment integrity assurance manager of the client, through a secure transport layer of the client and a secure transport layer of the apparatus.

28. The apparatus of claim 22, wherein the programming instructions are further designed to verify the integrity of the direct service providing and the supporting components requested in real time.

* * * * *

UNITED STATES PATENT AND TRADEMARK OFFICE
CERTIFICATE OF CORRECTION

PATENT NO. : 7,587,754 B2
APPLICATION NO. : 10/328957
DATED : September 8, 2009
INVENTOR(S) : DiFalco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 246 days.

Signed and Sealed this

Twenty-first Day of September, 2010

David J. Kappos
*Director of the United States Patent and Trademark Office*